(12) United States Patent
Harada et al.

(10) Patent No.: US 10,009,828 B2
(45) Date of Patent: Jun. 26, 2018

(54) USER TERMINAL AND INTER-TERMINAL COMMUNICATION METHOD

(71) Applicant: NTT DOCOMO, INC., Tokyo (JP)

(72) Inventors: Hiroki Harada, Tokyo (JP); Yongbo Zeng, Beijing (CN); Qun Zhao, Beijing (CN); Yongsheng Zhang, Beijing (CN)

(73) Assignee: NIT DOCOMO, INC., Tokyo (JP)

( * ) Notice: Subject to any disclaimer, the term of this patent is extended or adjusted under 35 U.S.C. 154(b) by 84 days.

(21) Appl. No.: 15/032,720

(22) PCT Filed: Oct. 16, 2014

(86) PCT No.: PCT/JP2014/077489
§ 371 (c)(1),
(2) Date: Apr. 28, 2016

(87) PCT Pub. No.: WO2015/064367
PCT Pub. Date: May 7, 2015

(65) Prior Publication Data
US 2016/0262084 A1   Sep. 8, 2016

(30) Foreign Application Priority Data
Oct. 31, 2013   (JP) ................................. 2013-227595

(51) Int. Cl.
*H04W 40/24*   (2009.01)
*H04J 11/00*   (2006.01)
(Continued)

(52) U.S. Cl.
CPC .......... *H04W 40/244* (2013.01); *H04J 11/00* (2013.01); *H04L 5/005* (2013.01); *H04L 27/10* (2013.01);
(Continued)

(58) Field of Classification Search
CPC .......... H04J 11/00; H04L 27/10; H04L 27/34; H04L 5/005; H04L 69/22; H04W 72/1215;
(Continued)

(56) References Cited

U.S. PATENT DOCUMENTS 8,526,342 B2 *   9/2013   Esteves ................. H04L 5/0053
                                                          370/310
9,326,122 B2 *   4/2016   Xiong ................... H04W 8/005
(Continued)

FOREIGN PATENT DOCUMENTS

WO   2014113537 A1   7/2014

OTHER PUBLICATIONS

International Search Report issued in PCT/JP2014/077489 dated Dec. 9, 2014 (1 page).
(Continued)

*Primary Examiner* — Ahmed Elallam
(74) *Attorney, Agent, or Firm* — Osha Liang LLP

(57) ABSTRACT

The present invention is designed so that, when a plurality of inter-terminal discovery signals with varying numbers of information bits are used in a radio communication system in which inter-terminal communication is carried out, user terminals can be discovered based on the inter-terminal discovery signals. According to the inter-terminal communication method of the present invention, a user terminal (#1) determines the signal format of a discovery signal based on the number of information bits of the discovery signal, transmits the discovery signal based on the signal format, and also transmits signal format information to represent this signal format. A user terminal (#2) receives the signal format information from the user terminal (#1), and, based on the signal format represented by the signal format information, detects the discovery signal.

8 Claims, 13 Drawing Sheets

(51) Int. Cl.
    *H04L 27/10*    (2006.01)
    *H04L 27/34*    (2006.01)
    *H04L 29/06*    (2006.01)
    *H04L 5/00*     (2006.01)
    *H04W 72/12*    (2009.01)
    *H04W 8/00*     (2009.01)
    *H04W 88/06*    (2009.01)
(52) U.S. Cl.
    CPC .............. *H04L 27/34* (2013.01); *H04L 69/22* (2013.01); *H04W 8/005* (2013.01); *H04W 72/1215* (2013.01); *H04W 72/1263* (2013.01); *H04W 88/06* (2013.01)
(58) Field of Classification Search
    CPC . H04W 72/1263; H04W 88/06; H04W 8/005; H04W 40/246; H04W 48/16; H04W 40/244
    See application file for complete search history.

(56)    References Cited

U.S. PATENT DOCUMENTS

| | | | | |
|---|---|---|---|---|
| 9,462,450 | B2* | 10/2016 | Lee | H04W 8/005 |
| 2013/0114526 | A1* | 5/2013 | Ahn | H04W 40/246 |
| | | | | 370/329 |
| 2014/0112194 | A1* | 4/2014 | Novlan | H04W 48/16 |
| | | | | 370/254 |
| 2014/0269558 | A1* | 9/2014 | Sartori | H04W 48/16 |
| | | | | 370/329 |
| 2015/0045016 | A1* | 2/2015 | Xiong | H04W 8/005 |
| | | | | 455/426.1 |
| 2016/0142898 | A1* | 5/2016 | Poitau | H04W 72/0413 |
| | | | | 370/329 |
| 2016/0156510 | A1* | 6/2016 | Li | H04W 8/005 |
| | | | | 370/254 |
| 2016/0278053 | A1* | 9/2016 | Lee | H04B 7/26 |
| 2016/0337835 | A1* | 11/2016 | Xiong | H04W 8/005 |

OTHER PUBLICATIONS

Wiritten Opinion of the International Searching Authority issued in PCT/JP2014/077489 dated Dec. 9, 2014 (4 pages).
3GPP TR 36.814 V2.0.1; "3rd Generation Partnership Project; Technical Specification Group Radio Access Network; Further Advancements for E-UTRA Physical Layer Aspects (Release 9)"; Mar. 2010 (108 pages).
Office Action issued in corresponding Japanese Application No. 2013-227595, dated Aug. 15, 2017 (9 pages).

* cited by examiner

| SEQUENCE SUBSET | MODULATION SCHEME | DS TYPE |
| --- | --- | --- |
| SG1 | QPSK | short |
| SG2 | 16QAM | long |

FIG.3A

| SEQUENCE SUBSET | NUMBER OF PRB PAIRS | DS TYPE |
| --- | --- | --- |
| SG1 | 1 | short |
| SG2 | 2 | long |

FIG.3B

| SEQUENCE SUBSET | MODULATION SCHEME | NUMBER OF PRB PAIRS | DS TYPE |
| --- | --- | --- | --- |
| SG1 | QPSK | 1 | short1 |
| SG2 | QPSK | 2 | short2 |
| SG3 | 16QAM | 1 | long1 |
| SG4 | 16QAM | 2 | long2 |

FIG.3C

USER TERMINAL AND INTER-TERMINAL COMMUNICATION METHOD

TECHNICAL FIELD

The present invention relates to a user terminal and an inter-terminal communication method in a next-generation mobile communication system in which inter-terminal communication is carried out.

BACKGROUND ART

In the UMTS (Universal Mobile Telecommunications System) network, the specifications of long term evolution (LTE) have been drafted for the purpose of further increasing high speed data rates, providing lower delays and so on (see non-patent literature 1).

In this LTE and successor systems of LTE (referred to as, for example, "LTE-advanced," "FRA (Future Radio Access)," "4G," etc.), a radio communication system to support inter-terminal communication (D2D: Device-to-Device) is under study. In inter-terminal communication, a user terminal discovers other user terminals (discovery) without involving radio base stations (that is, directly), and communicates with these other user terminals.

CITATION LIST

Non-Patent Literature

Non-Patent Literature 1: 3GPP TR 36.814 "E-UTRA Further Advancements for E-UTRA Physical Layer Aspects"

SUMMARY OF INVENTION

Technical Problem

For a radio communication system in which inter-terminal communication is carried out, a study is in progress to execute inter-terminal discovery (D2D discovery), whereby each user terminal discovers other user terminals without involving radio base stations (that is, directly), by transmitting an inter-terminal discovery signal (discovery signal) in transmission durations of a predetermined period.

Regarding this inter-terminal discovery, a study is in progress to use a plurality of inter-terminal discovery signals with varying numbers of information bits (for example, a short discovery message, a long discovery message, and so on) depending on various types of usage. When inter-terminal discovery signals with varying numbers of information bits are used, it may occur that these inter-terminal discovery signals are modulated using varying modulation schemes (for example, QPSK (Quadrature Phase Shift Keying), 16 QAM (16 Quadrature Amplitude Modulation), etc.). Similarly, these inter-terminal discovery signals may be mapped to varying numbers of resource units (for example, to one PRB (Physical Resource Block) pair, to two PRB pairs, etc.).

However, when inter-terminal discovery signals are modulated using varying modulation schemes and/or when inter-terminal discovery signals are mapped to varying numbers of resource units, there is a threat that user terminals cannot be discovered based on the discovery signals.

The present invention has been made in view of the above, and it is therefore an object of the present invention to provide a user terminal and an inter-terminal communication method, whereby, when a plurality of inter-terminal discovery signals with varying numbers of information bits are used in a radio communication system in which inter-terminal communication is carried out, user terminals can be discovered based on inter-terminal discovery signals.

Solution to Problem

The inter-terminal communication method according to the present invention provides an inter-terminal communication method for use in a radio communication system in which an inter-terminal discovery signal is transmitted from a first user terminal to a second user terminal without involving a radio base station, and this inter-terminal communication method includes the steps of: in the first user terminal: determining a signal format of the inter-terminal discovery signal based on a number of information bits of the inter-terminal discovery signal; and transmitting the inter-terminal discovery signal based on the signal format, and also transmitting signal format information that represents the signal format; and, in the second user terminal: receiving the signal format information from the first user terminal; and detecting the inter-terminal discovery signal based on the signal format represented by the signal format information.

Advantageous Effects of Invention

According to the present invention, when a plurality of inter-terminal discovery signals with varying numbers of information bits are used in a radio communication system in which inter-terminal communication is carried out, it is possible to discover user terminals based on inter-terminal discovery signals.

BRIEF DESCRIPTION OF DRAWINGS

FIG. 3 provides diagrams to explain an inter-terminal communication method according to an example 1.1 of the present invention;

DESCRIPTION OF EMBODIMENTS

Figure 1A:
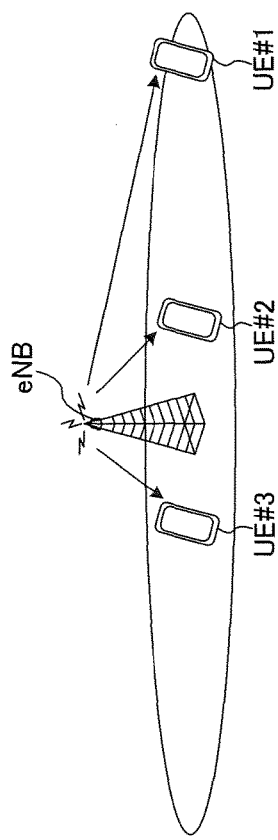
FIG. 1 provides diagrams to show an example of a radio communication system in which inter-terminal communication is carried out.

FIG. 1 provides diagrams to show an example of a radio communication system in which inter-terminal communication (D2D communication) is carried out. As shown in FIG. 1A, the radio communication system is formed by including a radio base station (eNB: eNodeB) and user terminals (UE: User Equipment) #1 to #3 in the cell formed by the radio base station. Note that, in FIG. 1A, a plurality of radio base stations may be provided, and the number of user terminals is not limited to 3 either.

In the radio communication system shown in FIG. 1A, the radio base station reports information that represents DS transmission durations (for example, subframe offset, the period of these DS transmission durations, the number of subframes in these DS transmission durations, and so on) to user terminals #1 to #3. Note that this report is sent by using, for example, the SIB (System Information Block), RRC (Radio Resource Control) signaling, a broadcast channel (PBCH: Physical Broadcast Channel) and so on.

Figure 1B:
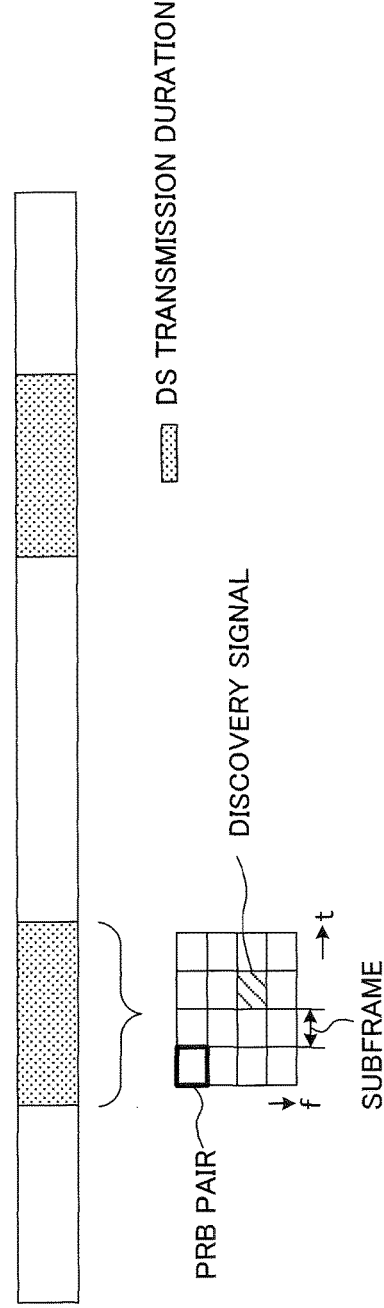

The DS transmission durations here refer to the transmission durations of discovery signals, provided in a predetermined period. For example, as shown in FIG. 1B, a DS transmission duration (uplink resource allocation for D2D discovery, D2D discovery resource, etc.), which is arranged in a predetermined period as an uplink resource, is comprised of, for example, a plurality of subframes.

Also, the discovery signals here refer to inter-terminal discovery signals for allowing user terminals #1 to #3 to discover one another. A discovery signal is formed with, for example, 104 bits, and allocated to predetermined resource units (for example, at least one PRB (Physical Resource Block) pair) that is provided by dividing a DS transmission duration in frequency division (FDM) and/or in time division (TDM).

Each user terminal transmits the discovery signal in resource units (for example, at least one PRB pair) in DS transmission durations reported from the radio base station. Note that these resource units may be resource units that are randomly selected in DS transmission durations (type-1, collision-type, etc.), or may be resource units that are specified by the radio base station on a per user terminal basis (type-2, non-collision type, etc.).

Each user terminal detects the discovery signals transmitted from other user terminals in DS transmission durations, and discovers (identifies) other user terminals. Note that, in uplink resources apart from the DS transmission durations, each user terminal performs uplink communication with the radio base station.

Inter-terminal discovery (D2D discovery) in DS transmission durations will be described in detail with reference to FIG. 1B. Regarding inter-terminal discovery, a study is in progress to use a plurality of discovery signals with varying numbers of information bits (for example, a short discovery message, a long discovery message and so on) depending on various types of usage.

When a plurality of discovery signals with varying numbers of information bits are communicated by using a fixed number of resource units (for example, one PRB pair), it is preferable to apply varying modulation schemes to these multiple discovery signals. For example, it is desirable to modulate a discovery signal (long discovery message) of a type with a large number of information bits (hereinafter referred to as the "long type") by a high-order modulation scheme (for example, 16 QAM), and modulate a discovery signal (short discovery message) of a type with a small number of information bits (hereinafter referred to as the "short type") by a low-order modulation scheme (for example, QPSK).

Also, when a plurality of discovery signals with varying numbers of information bits are modulated by a fixed modulation scheme, it is preferable to allocate varying numbers of resource units to these multiple discovery signals. For example, it is desirable to allocate a predetermined number of resource units (for example, two PRB pairs) to the above-described long-type discovery signal, and allocate a smaller number of resource units (for example, one PRB pair) than the long type, to the short-type discovery signal.

In this way, when a plurality of discovery signals with varying numbers of information bits are used, it is desirable to make the signal format—including the modulation scheme, the coding rate, the number of resource units and so on—different depending on the number of information bits. Meanwhile, when each user terminal uses different signal formats depending on the number of information bits, there is a threat that each user terminal is unable to detect discovery signals and unable to discover other user terminals.

So, the present inventors have found out that, by reporting the signal formats of discovery signals, it is possible to detect discovery signals and discover other user terminals even when different signal formats are used depending on the number of information bits.

Now, the inter-terminal communication method according to the present invention will be described below in detail.

EXAMPLE 1

Figure 2:
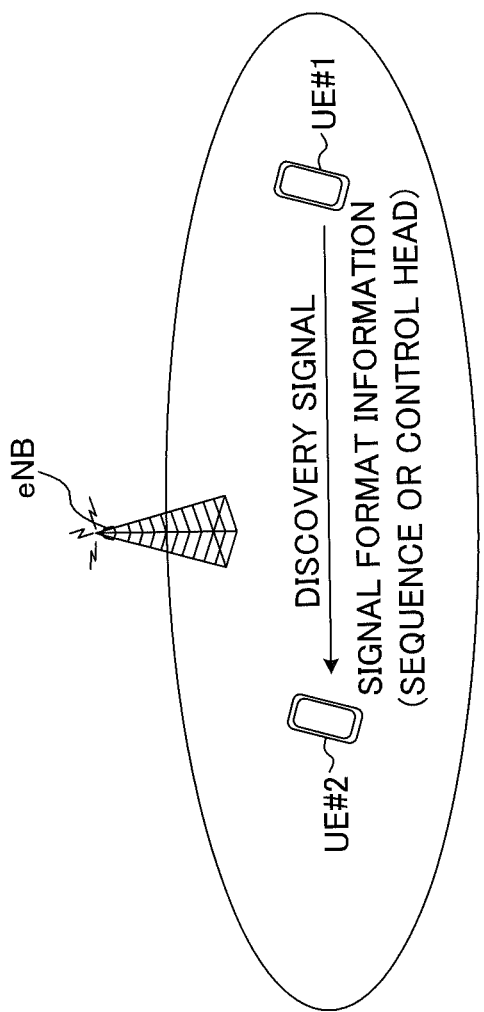
FIG. 2 is a conceptual diagram of an inter-terminal communication method according to an example 1 of the present invention.

The inter-terminal communication method according to an example 1 of the present invention will be described with reference to FIGS. 2 to 7. FIG. 2 is a conceptual diagram of the inter-terminal communication method according to example 1 of the present invention. As shown in FIG. 2, with the inter-terminal communication method according to example 1, a user terminal #1 determines the signal format of the discovery signal (inter-terminal discovery signal) based on the number of information bits of the discovery signal. Also, user terminal #1 transmits the discovery signal based on this signal format, and furthermore transmits signal format information to represent this signal format, to a user terminal #2.

Also, with the inter-terminal communication method according to example 1, user terminal #2 receives the signal format information of the discovery signal from user terminal #1. User terminal #2 detects the discovery signal based on the signal format represented by this signal format information.

Here, the signal format refers to at least one of the modulation scheme of the discovery signal, the coding rate of the discovery signal, and the number of resource units where the discovery signal is mapped (allocated). Note that, although the resource units will hereinafter be PRB pairs, which are each formed with two PRBs that are consecutive in the time direction, this is by no means limiting. The resource units may be PRBs, resource elements (REs), and so on.

Also, the above-noted signal format information to represent the signal format may be reported implicitly by using a predetermined signal sequence (example 1.1), or may be reported explicitly by using a control head constituting the discovery signal (example 1.2).

EXAMPLE 1.1

The inter-terminal communication method according to an example 1.1 of the present invention will be described with reference to FIGS. 3 and 4. With the inter-terminal communication method according to example 1.1, user terminal #1 reports signal format information to user terminal #2, implicitly, by using a predetermined signal sequence.

Here, the signal sequence to use to report the signal format information may be a signal sequence of, for example, the primary synchronization signal (PSS), the secondary synchronization signal (SSS), the sounding reference signal (SRS), the demodulation reference signal (DM-RS), a signal to resemble one of these, a signal that is newly stipulated, and so on. These signal sequences are also used for purposes such as discovery signal timing detection, channel estimation and equalization for the demodulation of information bits included in discovery signals, and so on.

With the inter-terminal communication method according to example 1.1, a plurality of signal sequences included in a sequence set are classified into a plurality of sequence subsets (also referred to as "sequence groups" (SGs)), which are each associated with a different signal format. For example, when a sequence set includes N signal sequences $\{S_1, S_2, \ldots S_N\}$ and is classified in two sequence subsets, the first sequence subset (SG1) includes N/2 signal sequences $\{S_1, S_2, \ldots S_{N/2}\}$, and the second sequence subset (SG2) includes $\{S_{N/2+1}, \ldots S_N\}$. Note that the classification of signal sequences is by no means limited to this.

Also, the number of sequence subsets into which a plurality of signal sequences are classified is equal to the number of signal formats. As will be described later, for example, when the signal format includes two modulation schemes, the number of sequence subsets is also two (FIG. 3A). Also, when the signal format includes two numbers of PRB pairs, the number of sequence subsets is also two (FIG. 3B). Also, when the signal format is the combination of two modulation schemes and two numbers of PRB pairs, the number of sequence subsets is four (FIG. 3C). Note that the number of signal formats—that is, the number of sequence subsets—is not limited to those illustrated in FIG. 3.

Also, the signal sequences to be included in each sequence subset may be cell-specific signal sequences. In this case, user terminal #1 may select the signal sequence of the serving cell from the sequence subset associated with the signal format of the discovery signal.

FIG. 3 provides diagrams to explain the associations between sequence subsets and signal formats in the inter-terminal communication method according to example 1.1. Note that, in FIG. 3, the DS type refers to the type of the discovery signal (here, the short type or the long type). The short type represents the discovery signal in which the number of information bits is relatively small, and the long type represents the discovery signal in which the number of information bits is relatively large.

In FIG. 3A, the sequence subset, modulation scheme, which is the signal format, and the DS type are associated with each other. In FIG. 3A, user terminal #1 modulates the discovery signal by the modulation scheme associated with the DS type. Also, user terminal #1 selects a signal sequences from the sequence subset associated with this modulation scheme. User terminal #1 transmits the discovery signal and the selected signal sequence to user terminal #2.

For example, when transmitting the short-type discovery signal, user terminal #1 modulates the discovery signal by QPSK, which is associated with the short type, and selects a sequence from the first sequence subset (SG1) associated with QPSK. On the other hand, when transmitting the long-type discovery signal, user terminal #1 modulates the discovery signal by 16 QAM, which is associated with the long type, and selects a signal sequence from the second sequence subset (SG2), which is associated with 16 QAM.

Also, in FIG. 3B, the sequence subset, the number of PRB pairs, which is the signal format, and the DS type are associated with each other. In FIG. 3B, user terminal #1 maps the discovery signal to PRB pairs of the number of PRB pairs associated with the DS type. Also, user terminal #1 selects a signal sequence from the sequence subset associated with this number of PRB pairs. User terminal #1 transmits the discovery signal and the selected signal sequence to user terminal #2.

Also, in FIG. 3C, the sequence subset, the modulation scheme and the number of PRB pairs, which are the signal format, and the DS type are associated with each other. In FIG. 3C, user terminal #1 modulates the discovery signal by the modulation scheme associated with the DS type, and maps the discovery signal to PRB pairs of the number of PRB pairs associated with this DS type. Also, user terminal #1 selects a sequence from the sequence subset associated with this number of PRB pairs. User terminal #1 transmits the discovery signal and the selected signal sequence to user terminal #2. Note that, in FIG. 3C, short type 1 (short 1) may have a smaller number of information bits than short type 2 (short 2), and long type 1 (long 1) may have a smaller number of information bits than long type 2 (long 2), but this is by no means limiting.

Note that, although not shown, it may be possible to associate sequence subsets with coding rates, in addition to modulation schemes and/or numbers of PRB pairs and DS types. For example, in FIG. 3C, it may be possible to associate sequence subsets (SGs) 2 and 4, in which the number of PRB pairs is "2," with relatively low coding rates, and associate sequence subsets (SGs) 1 and 3, in which the number of PRB pairs is "1," with relatively high coding rates. Also, FIG. 3A to FIG. 3C simply illustrate examples, and the modulation schemes, the numbers of PRB pairs and the DS types are by no means limited to those illustrated. Also, in FIG. 3A to FIG. 3C, the DS types may not be associated with the sequence subsets.

Figure 4A:
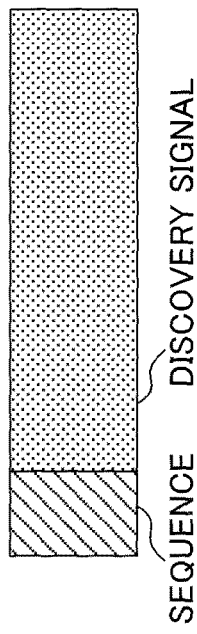
FIG. 4 provides diagrams to explain the inter-terminal communication method according to example 1.1 of the present invention.
Figure 4B:
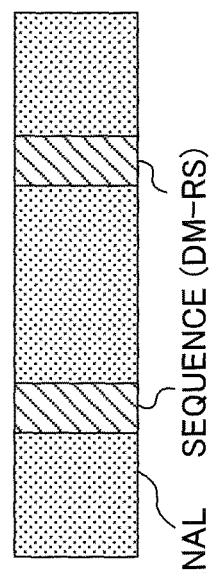

Now, the transmission of discovery signals and signal sequences in the inter-terminal communication method according to example 1.1 will be described with reference to FIG. 4. FIG. 4 is a diagram to explain the transmission of discovery signals and signal sequences (sequences) in the inter-terminal communication method according to example 1.1. As shown in FIG. 4, the discovery signal and the signal sequence may be time-division-multiplexed, or may be, although not shown, frequency-division-multiplexed, or may be both time-division-multiplexed and frequency-division-multiplexed. Time division multiplexing may be applied in OFDM symbol units or may be applied in subframe units. Also, frequency division multiplexing may be applied in resource element units, or may be applied in PRB units. Examples of time division multiplexing will be described with reference to FIG. 4A and FIG. 4B.

As shown in FIG. 4A, user terminal #1 may transmit the signal sequence (sequence) and the discovery signal separately (separate transmission). As described above, the signal sequence is selected from the sequence subset that is associated with the signal format of the discovery signal.

When separate transmission is carried out, the signal sequence may be the PSS or the SSS, may be a signal sequence of the SRS, which is a reference signal, or may be a signal sequence of a signal that is newly stipulated.

Alternatively, as shown in FIG. 4B, user terminal #1 may multiplex and transmit the signal sequence (sequence) and the discovery signal together (multiplex transmission). When multiplex transmission is carried out, the signal sequence may be a signal sequence of the DM-RS, which is a reference signal, or may be a signal sequence of a signal that is newly stipulated.

With the inter-terminal communication method according to example 1.1, a signal sequence, selected from the sequence subset that is associated with the signal format of the discovery signal, is transmitted from user terminal #1, with the discovery signal. Consequently, even when different signal formats are applied depending on the number of information bits in the discovery signal, user terminal #2 can detect the discovery signal from user terminal #1 based on this signal sequence, and discover user terminal #1. Also, since the signal format is reported implicitly by using the signal sequence, it is possible to reduce the overhead.

EXAMPLE 1.2

The inter-terminal communication method according to an example 1.2 of the present invention will be described with reference to FIGS. 5 and 6. With the inter-terminal communication method according to example 1.2, user terminal #1 reports signal format information to user terminal #2, explicitly, by using the control head of the discovery signal.

With the inter-terminal communication method according to example 1.2, the discovery signal is formed by including a control head and a payload. Signal format information that represents the signal format of the discovery signal (payload) is included in this control head.

Figure 5A:
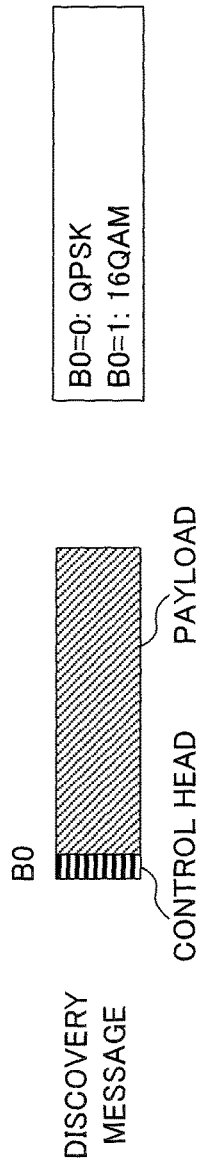
FIG. 5 provides diagrams to explain an inter-terminal communication method according to an example 1.2 of the present invention.
Figure 5B:
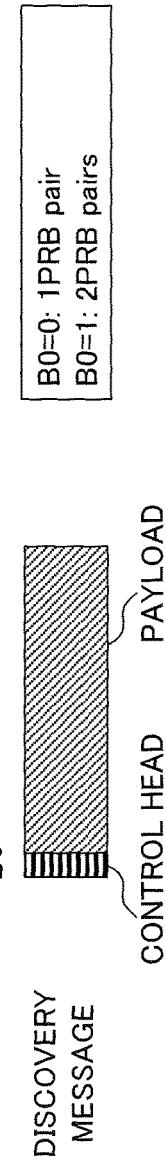
Figure 5C:
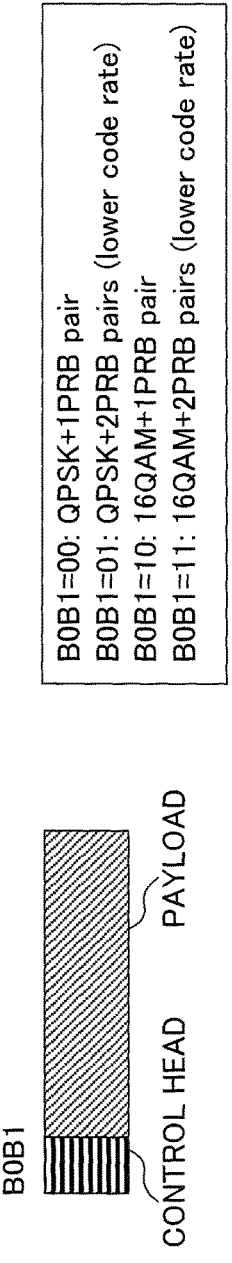

Also, the number of bits of the control head is configured based on the number of signal formats. As will be described later, for example, when the signal format includes two modulation schemes, the number of bits of the control head is 1 (FIG. 5A). Also, when the signal format includes two numbers of PRB pairs, the number of bits in the control head is 1 (FIG. 5B). Also, when the signal format is the combination of two modulation schemes and two numbers of PRB pairs, the number of bits of the control head is 2 (FIG. 5C). Note that the number of signal formats—that is, the number of bits in the control head—is not limited to those illustrated in FIG. 5.

FIG. 5 is a diagram to explain signal formats of the payload represented by the control head in the inter-terminal communication method according to example 1.2. In FIG. 5A, the control head shows the modulation scheme of the payload. In FIG. 5A, user terminal #1 modulates the payload by the modulation scheme that is determined based on the DS type, and attaches a control head to show this modulation scheme to the payload. User terminal #1 transmits the discovery signal, which includes the control head and the payload, to user terminal #2.

For example, when transmitting the short-type discovery signal, user terminal #1 modulates the discovery signal by QPSK, and attaches the control head "0," representing this QPSK, to the payload. On the other hand, when transmitting the long-type discovery signal, user terminal #1 modulates the discovery signal by 16 QAM, and attaches the control head "1," representing 16 QAM, to the payload.

Also, in FIG. 5B, the control head represents the number of PRB pairs where the payload is mapped. In FIG. 5B, user terminal #1 maps the payload to PRB pairs of the number of PRB pairs determined based on the DS type, and attaches a control head to represent this number of PRB pairs, to the payload. User terminal #1 transmits the discovery signal, including the control head and the payload, to user terminal #2.

Also, in FIG. 5C, the control head represents the modulation scheme of the payload and the number of PRB pairs where the payload is mapped. In FIG. 5C, user terminal #1 modulates the payload by the modulation scheme that is determined based on the DS type, and maps the payload to PRB pairs of the numbers of PRB pairs determined based on this DS type. Also, user terminal #1 attaches a control head representing this modulation scheme and the number of PRB pairs, to the payload. User terminal #1 transmits the discovery signal, which includes the control head and the payload, to user terminal #2.

Also, in FIG. 5C, the control head may represent the coding rate of the payload, in addition to the modulation scheme and the number of PRB pairs of the payload. For example, when the payload is mapped to two PRB pairs, user terminal #1 may encode the payload by a relatively low coding rate (lower code rate) and attach a control head ("01" or "11" in FIG. 5C) representing the coding rate, to the payload.

Note that FIG. 5A to FIG. 5C simply illustrate examples, and the modulation schemes, the numbers of PRB pairs and the coding rates are by no means limited to those illustrated.

The mapping of control heads in the inter-terminal communication method according to example 1.2 will be described with reference to FIG. 6. FIG. 6 provides diagrams to explain the mapping of control heads in the inter-terminal communication method according to example 1.2.

Figure 6A:
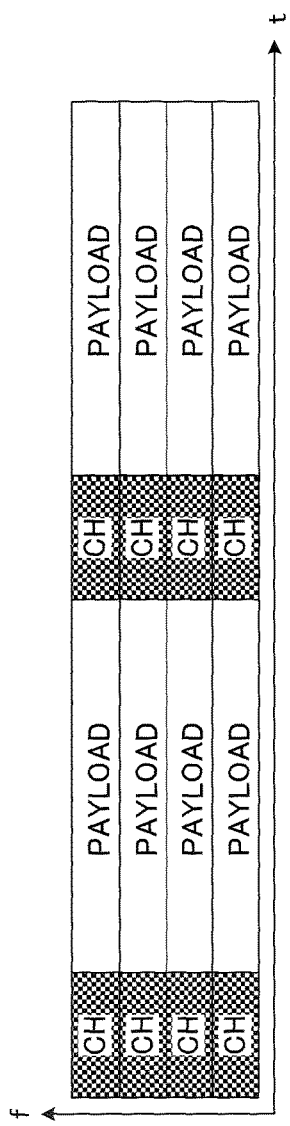
FIG. 6 provides diagrams to explain the inter-terminal communication method according to example 1.2 of the present invention.

As shown in FIG. 6A, user terminal #1 may map the above-described control head to the same number of resource units in the frequency direction (for example, PRBs) as those of the payload. For example, when the payload is mapped to one PRB in the frequency direction, user terminal #1 maps the control head to one PRB in the frequency direction. Also, when the payload is mapped to two PRBs in the frequency direction, user terminal #1 maps the control head to two PRBs in the frequency direction.

In the case illustrated in FIG. 6A, user terminal #2 to receive the discovery signal including this control head and the payload has to blind-decode the control head without knowing the number of frequency resource units to which the control head is mapped. Consequently, there is a threat that the processing load in user terminal #2 increases.

Figure 6B:
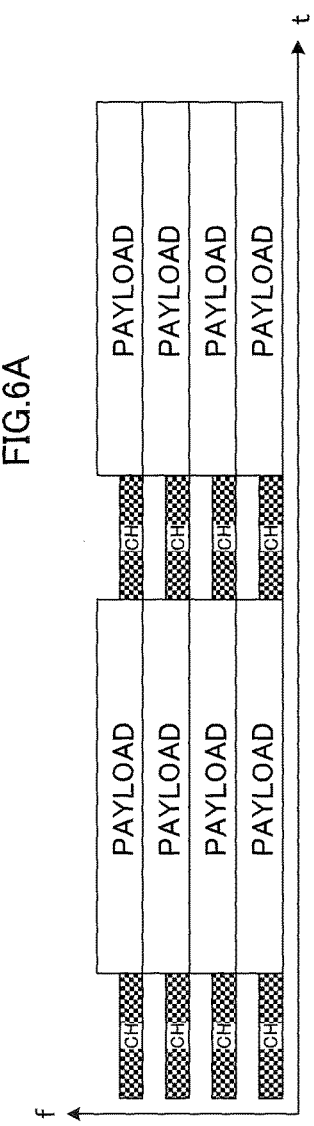

Alternatively, as shown in FIG. 6B, user terminal #1 may map the above-described control head to a predetermined number of (for example, one) resource units in the frequency direction, regardless of the number of resource units of the payload in the frequency direction. In this case, for example, even when the payload is mapped to two PRBs in the frequency direction, user terminal #1 maps the control head to one PRB in the frequency direction.

In the case illustrated in FIG. 6B, it is preferable to stipulate the relationship between the frequency resource units where the payload is mapped and the frequency resource units where the control head is mapped. For example, as shown in FIG. 6B, the control head may be mapped to the minimum index value of resource units in the frequency direction amongst the resource units (for example, two PRBs) in the frequency direction where the payload is mapped.

Figure 6C:
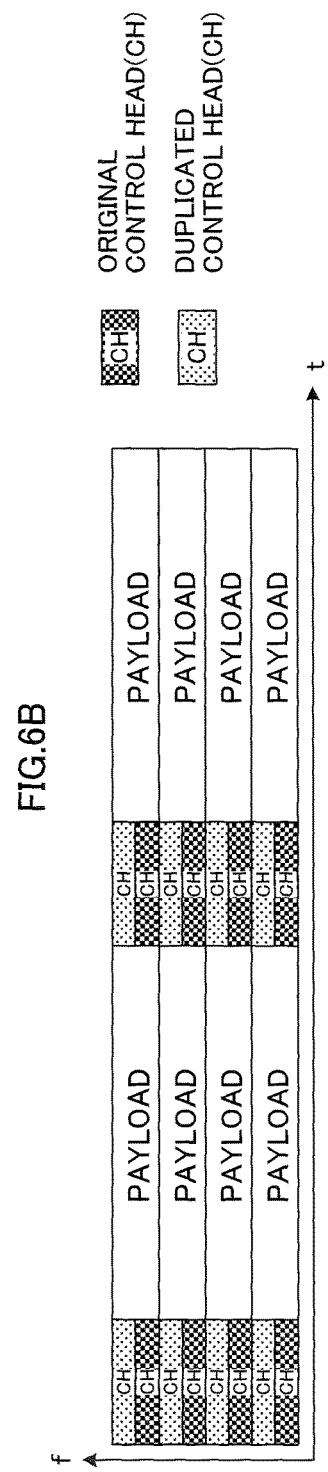

Alternatively, as shown in FIG. 6C, user terminal #1 may produce duplicates based on the number of resource units of the payload in the frequency direction and map these. For example, user terminal #1 maps the original control head and a control head (duplicated control head) that is duplicated by rotating the phase of the original control head, to resource units in the frequency direction. For example, when the payload is mapped to two PRBs in the frequency direction, user terminal #1 maps each redundant control head to one PRB in the frequency direction.

With the inter-terminal communication method according to example 1.2, a discovery signal that is formed by including a payload and a control head to represent the signal format of this payload is transmitted from user terminal #1. Consequently, even when different signal formats are used depending on the number of information bits in the discovery signal, user terminal #2 can detect the discovery signal from user terminal #1 based on the control head, and discover user terminal #1. Also, by explicitly reporting the signal format by using a control head, it is possible to represent more signal formats.

EXAMPLE 2

The inter-terminal communication method according to an example 2 of the present invention will be described with reference to FIG. 7. The inter-terminal communication method according to example 2 is different from example 1 in that the radio base station, not user terminal #1, transmits signal format information. Now, differences from example 1 will be primarily described below.

Figure 7:
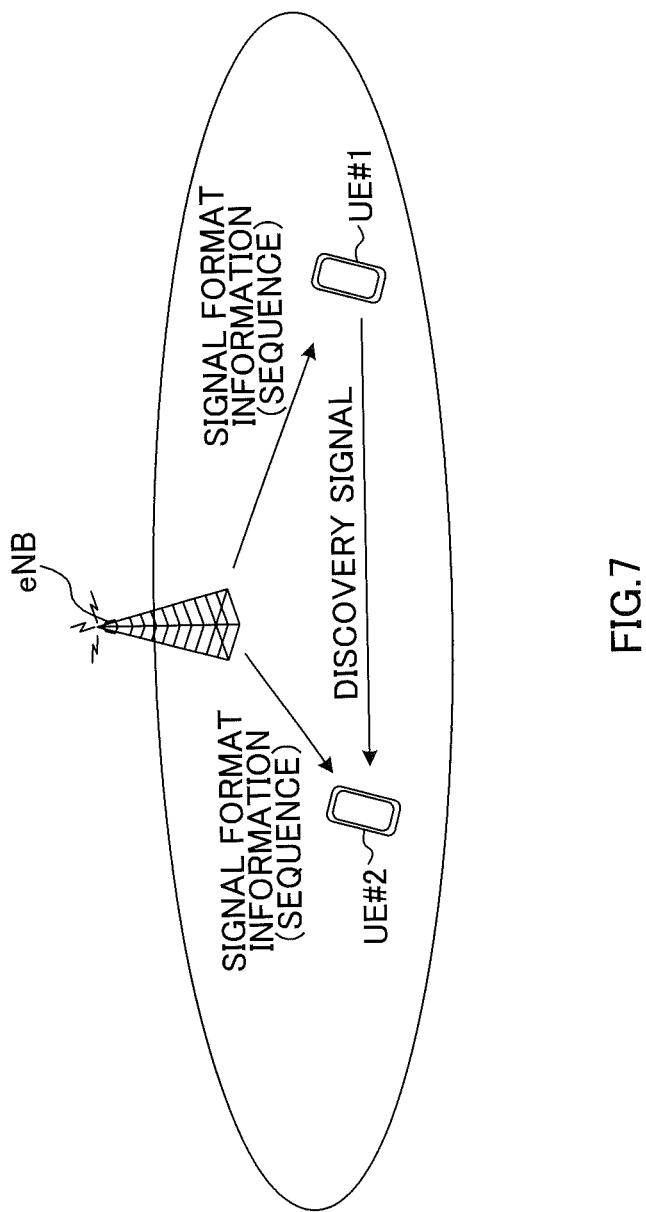
FIG. 7 is a conceptual diagram of an inter-terminal communication method according to an example 2 of the present invention.

As shown in FIG. 7, with the inter-terminal communication method according to example 2, the radio base station determines the signal format of the discovery signal (inter-terminal discovery signal) based on the number of information bits of the discovery signal, and transmits (broadcasts) signal format information to represent this signal format.

Also, with the inter-terminal communication method according to example 2, user terminal #1 transmits the discovery signal based on the signal format represented by signal format information from the radio base station. User terminal #2 detects the discovery signal from user terminal #1 based on the signal format represented by the signal format information from the radio base station.

The above-noted signal format information to represent the signal format may be reported implicitly by using a predetermined signal sequence (sequence) (example 2.1), or may be reported explicitly by using a broadcast signal (SIB, PBCH), RRC signaling and so on (example 2.2).

EXAMPLE 2.1

With the inter-terminal communication method according to an example 2.1, the radio base station transmits (broadcasts) signal format information to user terminal #1 and/or #2, implicitly, by using a predetermined signal sequence (sequence). This signal sequence may be a signal sequence of any of, for example, the reference signal for channel state information measurements between the radio base station and the user terminals (CSI-RS: Channel State Information-Reference Signal), the demodulation reference signal (DM-RS), a signal that is newly stipulated, and so on. These signal sequences may be associated with virtual cell IDs (virtual cell identifiers). By this means, it is possible to use signal sequences of varying virtual cell IDs depending on changes, for the signal format of the discovery signal.

Similar to example 1.1, with the inter-terminal communication method according to example 2.1, a plurality of signal sequences included in a sequence set are classified into a plurality of sequence subsets (also referred to as "sequence groups" (SGs)) that are each associated with a different signal format. The radio base station selects a signal sequence from the sequence subset that is associated with the signal format determined based on the number of information bits in the discovery signal, and transmits the selected signal sequence (see FIG. 3).

Note that the signal sequences to be included in each sequence subset may be cell-specific signal sequences. In this case, the radio base station may select its own cell's signal sequence from the sequence subset that is associated with the signal format of the discovery signal.

User terminal #1 transmits the discovery signal based on the signal format associated with the signal sequence from the radio base station. User terminal #2 detects the discovery signal from user terminal #1 based on the signal format associated with the signal sequence from the radio base station.

With the inter-terminal communication method according to example 2.1, a signal sequence that is selected from the sequence subset associated with the signal format of the discovery signal is transmitted (broadcast) from the radio base station. Consequently, even when different signal formats are employed depending on the number of information bits of the discovery signal, user terminal #2 can detect the discovery signal from user terminal #1 based on this signal sequence and discover user terminal #1. Also, by implicitly reporting the signal format using the signal sequence, it is possible to reduce the overhead.

EXAMPLE 2.2

With the inter-terminal communication method according to an example 2.2, the radio base station transmits (broadcasts) signal format information to user terminal #1 and/or #2, explicitly. For example, the radio base station may broadcast the signal format information by using a broadcast signal (SIB, PBCH, etc.), or may report the signal format information, on a per user terminal basis, by using RRC signaling. Note that, in this case, the signal format information may be bit information to represent the signal format (see FIG. 5).

EXAMPLE 3

FIG. 8 provides diagrams to explain the inter-terminal communication method according to an example 3 of the present invention. The inter-terminal communication method according to example 3 can be combined with the above-described inter-terminal communication methods according to examples 1 and 2. FIG. 8 provides diagrams to explain the inter-terminal communication method according to example 3. Note that, in the inter-terminal communication method according to example 3, the signal format at least includes the number of PRB pairs (the number of resource units).

Figure 8A:
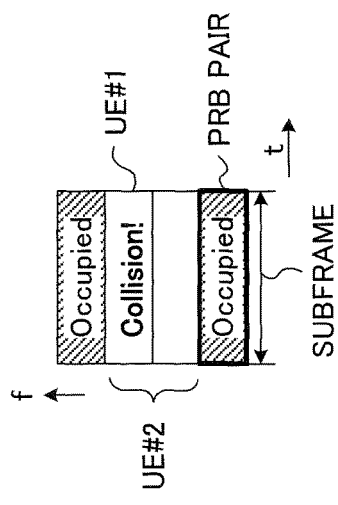
FIG. 8 provides diagrams to explain an inter-terminal communication method according to an example 3 of the present invention.

As shown in FIG. 8A, the discovery signal for user terminal #1 for one PRB pair, and the discovery signal for user terminal #2 for two PRB pairs are mapped in the same subframe, there is a threat that the discovery signals of user terminals #1 and #2 collide in part. Alternatively, if the user terminal for one PRB pair tries to use only discovery signal resources of odd-numbered indices or even-numbered indices in order to avoid the partial collision, there will be unoccupied resources, and the efficiency of the use of resources deteriorates.

So, with the inter-terminal communication method according to example 3, the DS transmission duration includes a plurality of durations, which vary according to the number of PRB pairs to which the discovery signal is mapped. For example, as shown in FIG. 8B, the DS transmission duration is formed with a first duration in which the discovery signal is mapped to one PRB pair (resource units) and a second duration in which the discovery signal is mapped to two PRB pairs.

Figure 8B:
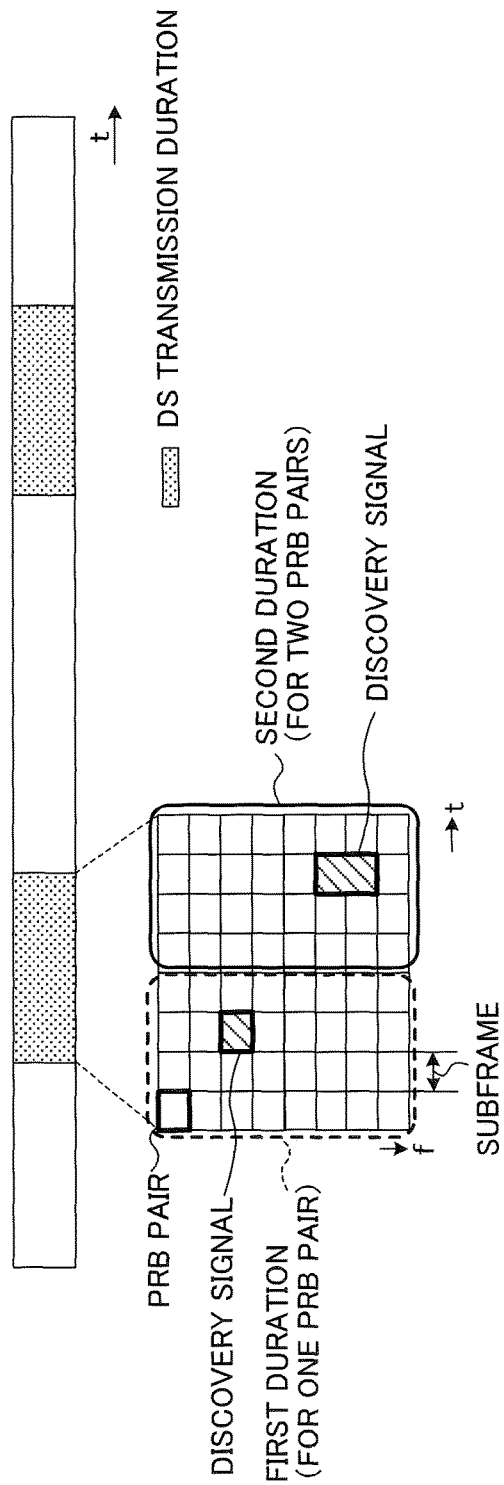

As shown in FIG. 8B, by time-division-multiplexing (TDM) DS transmission durations for every number of PRB pairs where the discovery signal is mapped, it is possible to prevent the collision of FIG. 8A from occurring. Note that the arrangement of the first duration and the second duration in FIG. 8B is simply an example, and this is by no means limiting. For example, it is possible to provide the second duration before the first duration.

Also, although each DS transmission duration is divided into the first duration and the second duration in FIG. 8B, this is by no means limiting. Although not shown, it is possible to make the first DS transmission duration in FIG. 8B the first duration and the following DS transmission duration the second duration. In this way, the first duration and the second duration may assume any arrangement, as long as they are time-division-multiplexed.

Also, with the inter-terminal communication method according to example 3, the radio base station may report allocation information, which represents the allocation of the first duration for one PRB pair and the second duration for two PRB pairs, to user terminals. This allocation information may be reported to user terminals by using, for example, the SIB, RRC signaling, a broadcast channel, and so on. Alternatively, when a plurality of user terminals form a cluster, a specific user terminal in this cluster may report the above-noted allocation information to the other user terminals.

With the inter-terminal communication method according to example 3, different transmission durations are provided for every number of PRB pairs to which the discovery signal is mapped. Consequently, even when there are a plurality of discovery signals to be mapped to varying numbers of PRB pairs, it is possible to prevent collisions from occurring between these multiple discovery signals.

(Structure of Radio Communication System)

Now, the radio communication system according to the present embodiment will be described in detail below. In this radio communication system, the above-described inter-terminal communication methods according to examples 1 to 3 are employed. Note that the radio communication system according to the present embodiment may be a radio communication system to include a radio base station and a user terminal, or may be a radio communication system, which does not include radio base stations, and in which a plurality of user terminals form a cluster. Below, a radio communication system to include a radio base station and user terminals will be described as an example.

Figure 9:
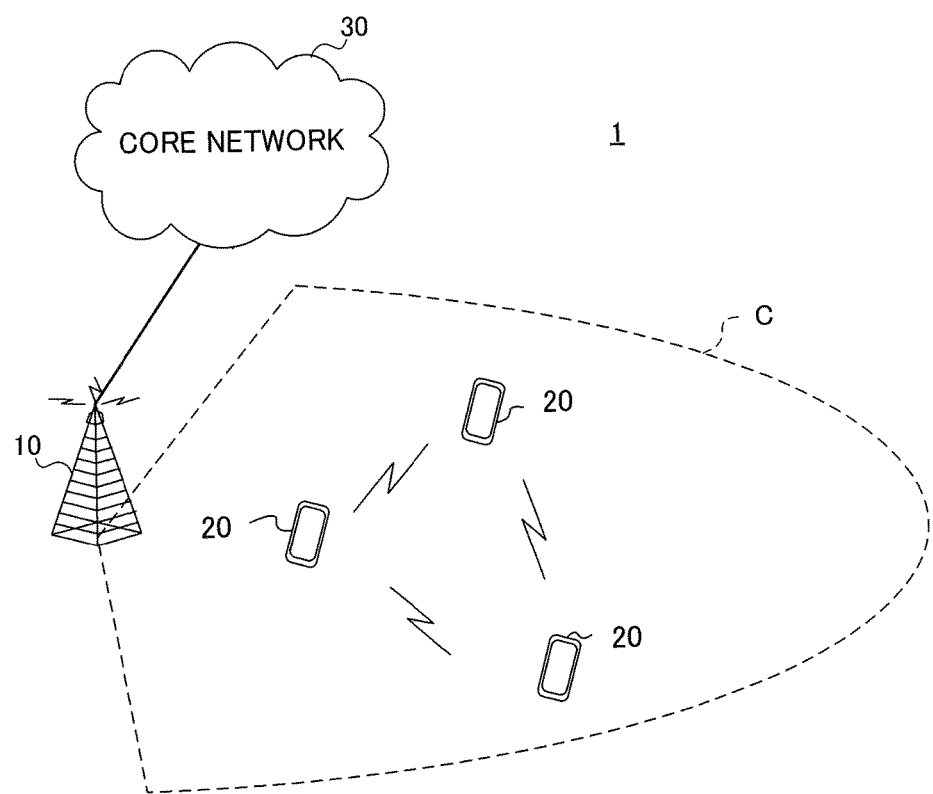
FIG. 9 is a schematic diagram to show an example of a radio communication system according to the present embodiment.

FIG. 9 is a diagram to show a schematic structure of the radio communication system according to the present embodiment. As shown in FIG. 9, the radio communication system 1 includes a radio base station 10 that forms a cell C, user terminals 20, and a core network 30 to which the radio base station 10 is connected. Note that the numbers of radio base stations 10 and user terminals 20 are not limited to those shown in FIG. 9.

The radio base station 10 is a radio base station to have a predetermined coverage. Note that the radio base station 10 may be a macro base station having a relatively wide coverage (eNodeB, macro base station, aggregation node, transmission point, transmitting/receiving point), or may be a small base station having a local coverage (small base station, pico base station, femto base station, HeNB (Home eNodeB), RRH (Remote Radio Head), micro base station, transmission point, transmitting/receiving point).

The user terminals 20 are terminals to support various communication schemes such as LTE and LTE-A, and may not only cover mobile communication terminals, but may also cover stationary communication terminals as well. The user terminals 20 carry out downlink/uplink communication with the radio base station 10, and furthermore carry out inter-terminal (D2D) communication/detection with other user terminals 20.

Also, in the radio communication system 1, a physical downlink shared channel (PDSCH: Physical Downlink Shared Channel), which is used by each user terminal 20 on a shared basis, physical downlink control channels (PDCCH (Physical Downlink Control Channel), EPDCCH (Enhanced Physical Downlink Control Channel), a physical broadcast channel (PBCH)) and so on are used as downlink physical channels. User data, higher layer control information and a predetermined SIB (System Information Block) are communicated by the PDSCH. Downlink control information (DCI) is communicated by the PDCCH and the EPDCCH.

Also, in the radio communication system 1, a physical uplink shared channel (PUSCH: Physical Uplink Shared Channel), which is used by each user terminal 20 on a shared basis, a physical uplink control channel (PUCCH: Physical Uplink Control Channel) and so on are used as uplink physical channels. User data and higher layer control information are communicated by the PUSCH. In the radio communication system 1, discovery signals (inter-terminal discovery signals) for allowing the user terminals 20 to detect each other are transmitted on the uplink.

Figure 10:
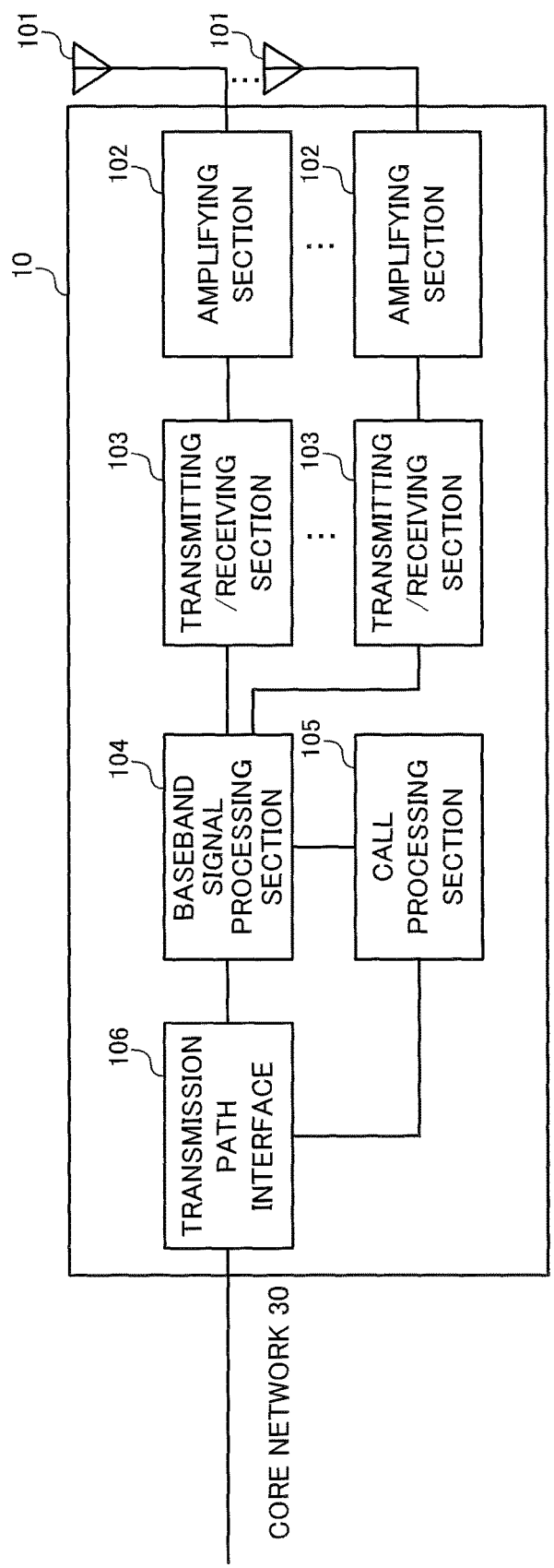
FIG. 10 is a diagram to show an overall structure of a radio base station according to the present embodiment.

Now, overall structures of the radio base station 10 and the user terminals 20 will be described with reference to FIGS. 10 and 11. FIG. 10 is a diagram to show an overall structure of the radio base station 10 according to the present embodiment. As shown in FIG. 10, the radio base station 10 has a plurality of transmitting/receiving antennas 101 for MIMO communication, amplifying sections 102, transmitting/receiving sections 103 (transmitting section and receiving section), a baseband signal processing section 104, a call processing section 105 and a communication path interface 106.

User data to be transmitted from the radio base station 10 to the user terminal 20 on the downlink is input from the S-GW provided in the core network 30, into the baseband signal processing section 104, via the communication path interface 106.

In the baseband signal processing section 104, a PDCP layer process, division and coupling of user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process and a precoding process are performed, and the result is forwarded to each transmitting/receiving section 103. Furthermore, downlink control signals (including reference signals, synchronization signals, broadcast signals, etc.) are also subjected to transmission processes such as channel coding and an inverse fast Fourier transform, and are forwarded to each transmitting/receiving section 103.

Each transmitting/receiving section 103 converts the downlink signals, which are pre-coded and output from the baseband signal processing section 104 on a per antenna basis, into a radio frequency. The amplifying sections 102 amplify the radio frequency signals having been subjected to frequency conversion, and transmit the signals through the transmitting/receiving antennas 101.

On the other hand, as for the uplink signals, radio frequency signals that are received in the transmitting/receiving antennas 101 are each amplified in the amplifying sections 102, converted into baseband signals through frequency conversion in each transmitting/receiving section 103, and input into the baseband signal processing section 104.

In the baseband signal processing section 104, the user data that is included in the input uplink signals is subjected to an FFT process, an IDFT process, error correction decoding, a MAC retransmission control receiving process and RLC layer and PDCP layer receiving processes, and the result is forwarded to the core network 30 via the communication path interface 106. The call processing section 105 performs call processing such as setting up and releasing communication channels, manages the state of the radio base station 10 and manages the radio resources.

Figure 11:
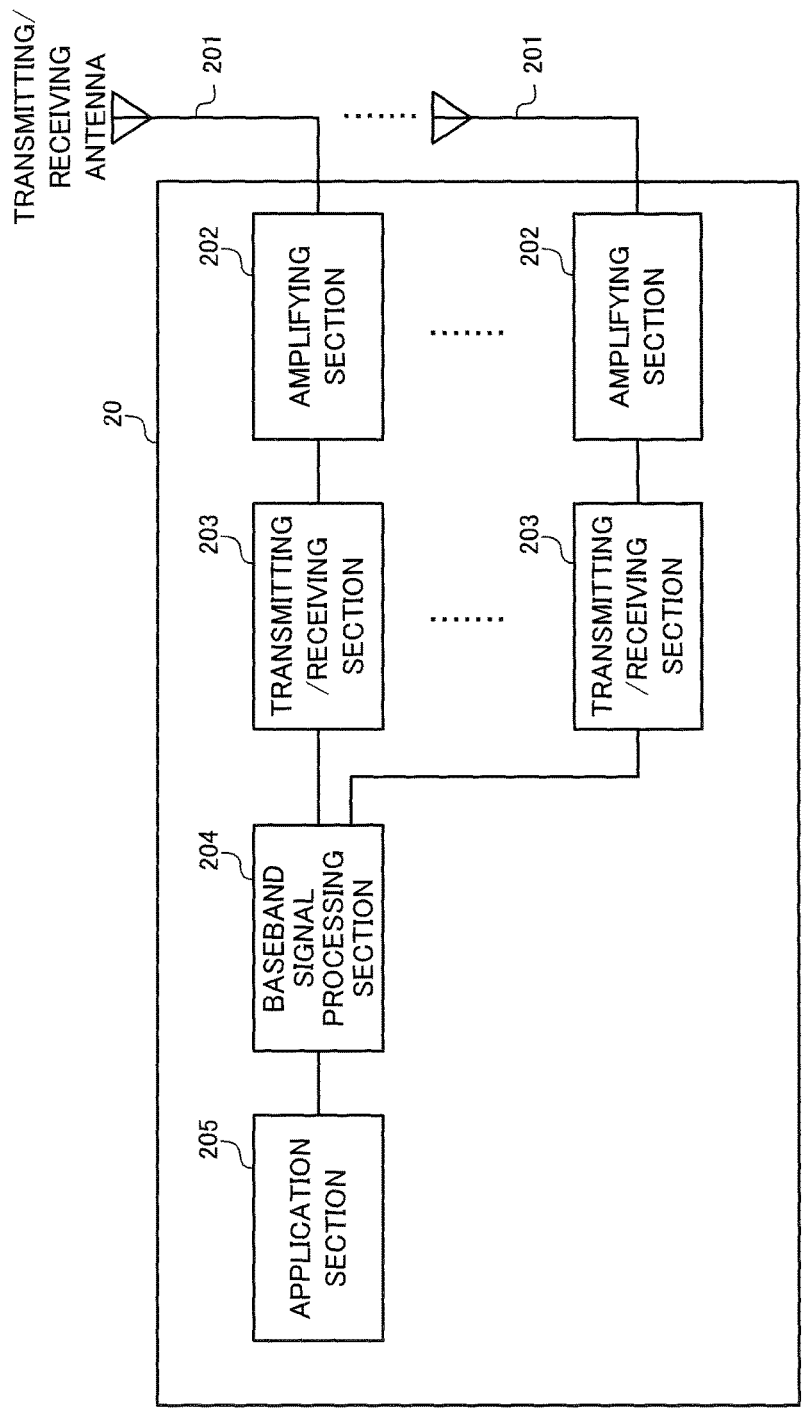
FIG. 11 is a diagram to explain an overall structure of a user terminal according to the present embodiment.

FIG. 11 is a diagram to show an overall structure of a user terminal 20 according to the present embodiment. The user terminal 20 has a plurality of transmitting/receiving antennas 201 for MIMO communication, amplifying sections 202, transmitting/receiving sections 203 (receiving section and transmitting section), a baseband signal processing section 204 and an application section 205. Note that the user terminal 20 may switch the receiving frequency by means of one receiving circuit (RF circuit), or may have a plurality of receiving circuits.

As for downlink signals, radio frequency signals that are received in a plurality of transmitting/receiving antennas 201 are each amplified in the amplifying sections 202, subjected to frequency conversion in the transmitting/receiving sections 203, and input in the baseband signal processing section 204. In the baseband signal processing section 204, an FFT process, error correction decoding, a retransmission control receiving process and so on are performed. The user data included in the downlink signals is forwarded to the application section 205. The application section 205 performs processes related to higher layers above the physical layer and the MAC layer. Furthermore, the broadcast information in the downlink data is also forwarded to the application section 205.

Meanwhile, uplink user data is input from the application section 205 into the baseband signal processing section 204. The baseband signal processing section 204 performs a retransmission control (H-ARQ (Hybrid ARQ)) transmission process, channel coding, pre-coding, a DFT process, an IFFT process, a CP insertion process and so on, and the result is forwarded to each transmitting/receiving section 203. The baseband signal that is output from the baseband signal processing section 204 is converted into a radio frequency in the transmitting/receiving sections 203. After that, the amplifying sections 202 amplify the radio frequency signal having been subjected to frequency conversion, and transmit the result from the transmitting/receiving antennas 201.

Figure 12:
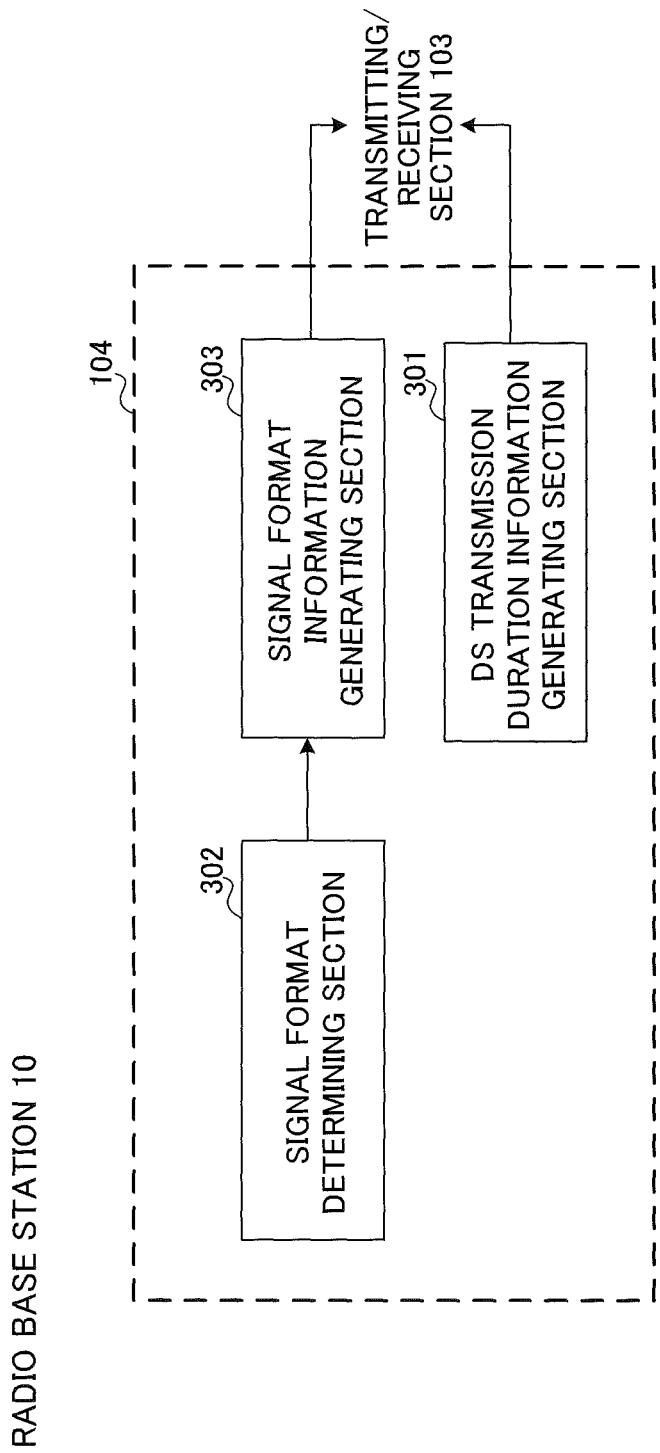
FIG. 12 is a diagram to show a functional structure of a radio base station according to the present embodiment.

Next, functional structures of the radio base station 10 and the user terminals 20 will be described with reference to FIGS. 12 and 13. The functional structure of the radio base station 10 shown in FIG. 12 is primarily formed with the baseband signal processing section 104 of FIG. 10. Also, the functional structure of the user terminal 20 shown in FIG. 13 is primarily formed with the baseband signal processing section 204 of FIG. 11.

FIG. 12 is a diagram to show a functional structure of the radio base station 10 according to the present embodiment. As shown in FIG. 12, the radio base station 10 has a DS transmission duration information generating section 301, a signal format determining section 302 and a signal format information generating section 303. Note that, with the above-described inter-terminal communication methods according to examples 1 and 3, the signal format determining section 302 and the signal format information generating section 303 may be omitted.

The DS transmission duration information generating section 301 generates information to represent DS transmission durations (for example, subframe offset, the cycle of these DS transmission durations, the number of subframes in these DS transmission durations, and so on), and outputs this information to the transmitting/receiving sections 103. This information is transmitted to the user terminal 20 by using, for example, the SIB, RRC signaling, a broadcast channel and so on.

Also, the DS transmission duration information generating section 301 may generate information to represent a plurality of varying durations (for example, the first duration and the second duration in FIG. 8B) for every number of PRB pairs where the discovery signal is mapped, and output these to the transmitting/receiving sections 103 (example 3, FIG. 8B).

The signal format determining section 302 determines the signal format of the discovery signal (inter-terminal discovery signal) (example 2, FIG. 7). To be more specific, the signal format determining section 302 determines the signal format based on the number of information bits of the discovery signal. As described above, the signal format may be at least one of the modulation scheme of the discovery signal, the coding rate of the discovery signal and the number of resource units to which the discovery signal is mapped (allocated).

The signal format information generating section 303 generates signal format information to represent the signal format determined in the signal format determining section 302 (example 2, FIG. 7). As described above, the signal format information is, for example, predetermined signal sequences of the CSI-RS, the DM-RS and so on (example 2.1). The signal sequences are classified into a plurality of sequence subsets (also referred to as "sequence groups" (SGs)) that are each associated with a different signal format.

The signal format information generating section 303 selects a signal sequence from the sequence subset that is associated with the signal format determined in the signal format determining section 302 (example 2.1, FIG. 3).

The signal format information generating section 303 outputs the selected signal sequence to the transmitting/receiving sections 103. The signal sequence is transmitted on the downlink from the transmitting/receiving sections 103.

Alternatively, the signal format information generating section 303 may generate signal format information (for example, the bit information in FIG. 5) to represent the signal format determined in the signal format determining section 302, and output this signal format information to the transmitting/receiving sections 103 (example 2.2). This signal format information is transmitted from the transmitting/ receiving sections 103 by using a broadcast signal (SIB, PBCH and so on), RRC signaling and so on.

Figures 13A, 13B:
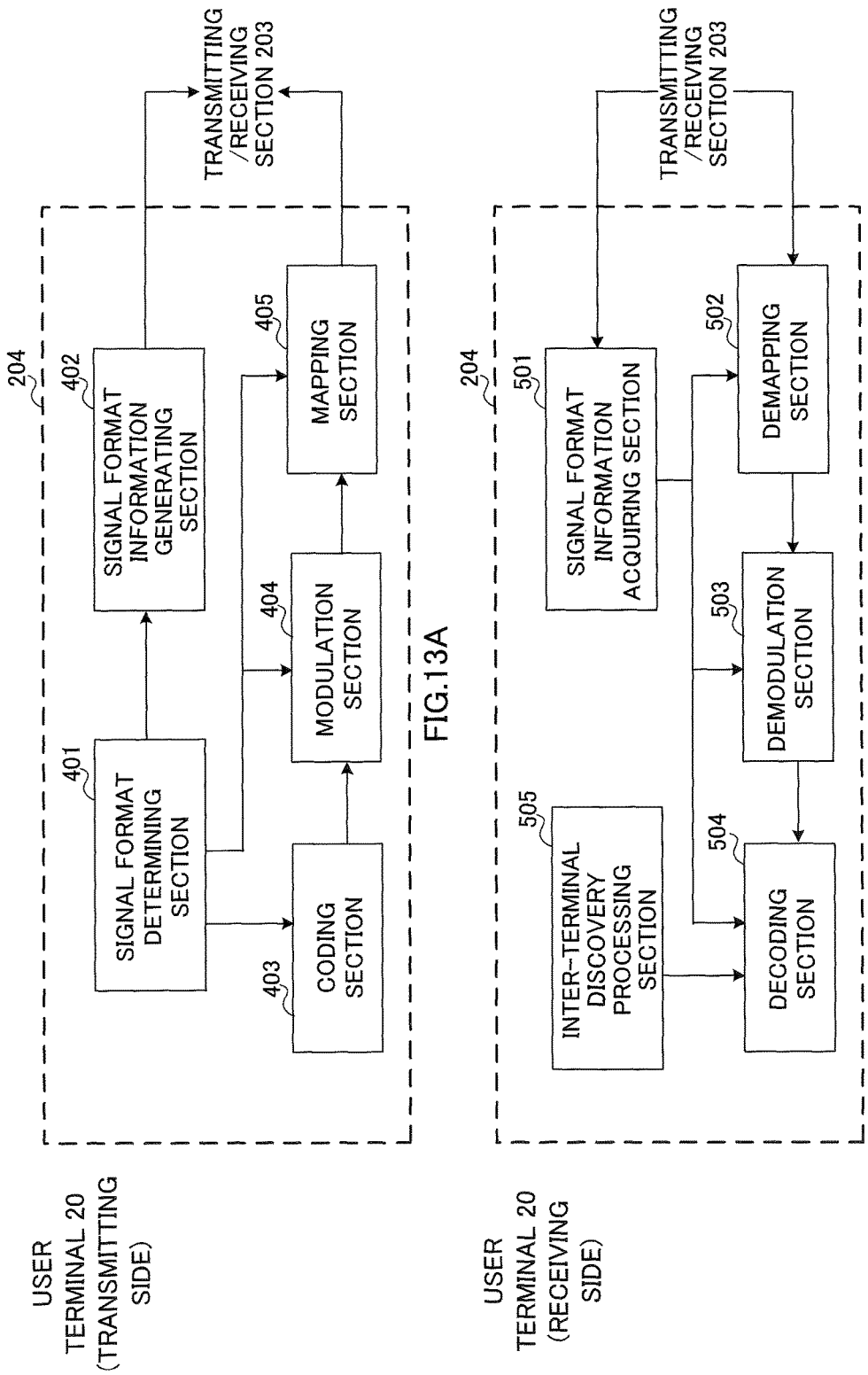
FIG. 13 is a diagram to show a functional structure of a user terminal according to the present embodiment.

FIG. 13 is a diagram to show a functional structure of the user terminal 20 according to the present embodiment. FIG. 13A is a diagram to show a functional structure of the transmitting side of the user terminal 20. As shown in FIG. 13A, the user terminal 20 has a signal format determining section (determining section) 401, a signal format information generating section 402, a coding section 403, a modulation section 404 and a mapping section 405. Note that, referring to FIG. 13A, in the inter-terminal communication method according to example 2, the signal format determining section 401 and the signal format information generating section 402 may be omitted.

The signal format determining section 401 determines the signal format of the discovery signal (inter-terminal discovery signal) (example 1, FIG. 2). To be more specific, the signal format determining section 401 determines the signal format based on the number of information bits of the discovery signal and so on. As described above, the signal format is at least one of the modulation scheme of the discovery signal, the coding rate of the discovery signal and the number of resource units to which the discovery signal is mapped (allocated).

The signal format information generating section 402 generates signal format information to represent the signal format determined by the signal format determining section 401 (example 1, FIG. 2). As noted earlier, the signal format information may be a predetermined signal sequence such as, for example, the PSS, the SSS, the SRS, the DM-RS, a signal to resemble these, a signal that is newly stipulated and so on (example 1.1), or may be included in the control head constituting the discovery signal (example 1.2).

When the signal format information is predetermined signal sequences example 1.1), the signal sequences are classified into a plurality of sequence subsets (also referred to as "sequence groups" (SGs)) that are each associated with a different signal format. The signal format information generating section 402 selects a signal sequence from the sequence subset that is associated with the signal format determined in the signal format determining section 401 (FIG. 3).

The selected signal sequence is output to the transmitting/receiving section 203, and, using an uplink resource, transmitted from the transmitting/receiving sections 203. Note that this signal sequence may be transmitted apart from the discovery signal (FIG. 4A), or may be multiplexed and transmitted with the discovery signal (FIG. 4B).

On the other hand, when signal format information is included in the control head (example 1.2), the signal format information generating section 402 generates a control head to represent the signal format determined in the signal format determining section 401.

The control head that is generated is output to the transmitting/receiving sections 203, and, using an uplink resource, transmitted from the transmitting/receiving sections 203. Here, the control head may be mapped to the same number of resource units (for example, PRBs) in the frequency direction as those of the payload (FIG. 6A). Alternatively, the control head may be mapped to a predetermined number of resource units in the frequency direction regardless of the number of resource units of the payload in the frequency direction (FIG. 6B). Alternatively, the control head may be duplicated and mapped based on the number of resource units of the payload in the frequency direction (FIG. 6C).

The coding section 403 encodes the discovery signal in accordance with the coding rate determined in the signal format determining section 401. For example, when the discovery signal is mapped to a plurality of resource units (for example, two PRB pairs), the coding section 403 may encode the discovery signal by using a relatively low coding rate that is specified by the signal format determining section 401.

The modulation section 404 may demodulate the discovery signal in accordance with the modulation scheme determined in the signal format determining section 401. For example, the modulation section 404 may modulate the discovery signal (short type, short discovery message) with a small number of information bits, by using a low-order modulation scheme (for example, QPSK) that is specified by the signal format determining section 401. Also, the modulation section 404 may modulate the discovery signal (long type, long discovery message) with a large number of information bits, by a high-order modulation scheme (for example, 16 QAM) that is specified by the signal format determining section 401.

The mapping section 405 maps the discovery signal to resource units of the number of resource units determined in the signal format determining section 401. For example, the mapping section 405 may map the discovery signal (short type, short discovery message) with a small number of information bits, to resource units of the number specified by the signal format determining section 401 (for example, one PRB pair). Also, the mapping section 405 may map the discovery signal (long type, long discovery message) with a large number of information bits, to a larger number of resource units (for example, two PRB pairs) than the short type.

As described above, the signal format determining section 401 and the signal format information generating section 402 of FIG. 13A may be omitted in the inter-terminal communication method according to example 2. With the inter-terminal communication method according to example 2, the coding in the coding section 403, the modulation in the modulation section 404 and the mapping in the mapping section 405 may be carried out based on signal format information transmitted from the radio base station 10.

FIG. 13B is a diagram to show a functional structure of the receiving side of the user terminal 20. In inter-terminal communication, the user terminal 20 not only can have downlink receiving functions, but can also have uplink resource receiving function as well. As shown in FIG. 13B, the user terminal 20 has a signal format information acquiring section 501, a demapping section 502, a demodulation section 503, a decoding section 504 and an inter-terminal discovery processing section (detection section) 505.

The signal format information acquiring section 501 acquires the signal format information that is received in the transmitting/receiving sections 203. Note that the signal format information may be transmitted from other user terminals 20 in uplink resources and received in the transmitting/receiving sections 203 (example 1), or may be transmitted from the radio base station 10 on the downlink and received in the transmitting/receiving sections 203 (example 2). The signal format information acquiring section 501 may indicate the number of resource units, the modulation scheme and the coding rate represented by the signal format information to the demapping section 502, the demodulation section 503 an the decoding section 504, respectively.

The demapping section 502 demaps discovery signals based on the number of resource units specified by the signal format information acquiring section 501.

The demodulation section 503 demodulates the discovery signal based on the modulation scheme specified by the signal format information acquiring section 501.

The decoding section 504 decodes the discovery signal based on the coding rate specified by the signal format information acquiring section 501.

The inter-terminal discovery processing section 505 executes an inter-terminal discovery process. To be more specific, the inter-terminal discovery processing section 505 detects the discovery signals decoded by the decoding section 504, and, using these discovery signals, discovers other user terminals 20

With the radio communication 1 system according to the present embodiment, signal format information to represent the signal format of discovery signals is transmitted. Consequently, even when different signal formats are employed depending on the number of information bits of discovery signals, user terminal 20 can detect the discovery signals from other user terminal 20 and discover these other user terminals 20.

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention. That is to say, the description herein is provided only for the purpose of explaining examples, and should by no means be construed to limit the present invention in any way.

The disclosure of Japanese Patent Application No. 2013-227595, filed on Oct. 31, 2013, including the specification, drawings and abstract, is incorporated herein by reference in its entirety.

The invention claimed is:

1. A user terminal that transmits an inter-terminal discovery signal to another user terminal without involving a radio base station, the user terminal comprising:
   a processor that determines a signal format of the inter-terminal discovery signal based on the number of information bits of the inter-terminal discovery signal; and
   a transmitter that transmits the inter-terminal discovery signal based on the signal format, and also transmits signal format information that represents the signal format,
   wherein the transmitter transmits the inter-terminal discovery signal in transmission durations of a predetermined cycle,
   wherein the transmission duration includes a plurality of durations that vary for every number of resource units where the inter-terminal discovery signal is mapped, and
   wherein the transmitter transmits the inter-terminal discovery signal in durations for the number of resource units where the inter-terminal discovery signal is mapped.

2. The user terminal according to claim 1, wherein:
   a plurality of signal sequences included in a sequence set are classified into a plurality of sequence subsets that are each associated with a different signal format; and
   the signal format information is a signal sequence that is selected from a sequence subset associated with the signal format determined by the processor.

3. The user terminal according to claim 2, wherein the transmitter multiplexes and transmits the inter-terminal discovery signal and the selected signal sequence in time division multiplexing and/or frequency division multiplexing.

4. The user terminal according to claim 1, wherein:
   the inter-terminal discovery signal is formed by including a control head and a payload; and
   the signal format information is included in the control head.

5. The user terminal according to claim 4, wherein the control head is mapped to a same number of resource units in a frequency direction as those of the payload, mapped to a predetermined number of resource units in the frequency direction regardless of a number of resource units of the payload in the frequency direction, or duplicated and mapped based on the number of resource units of the payload in the frequency direction.

6. The user terminal according to claim 1, wherein the signal format is at least one of a modulation scheme of the inter-terminal discovery signal, a coding rate of the inter-terminal discovery signal and a number of resource units where the inter-terminal discovery signal is mapped.

7. A user terminal that receives an inter-terminal discovery signal from another user terminal without involving a radio base station, the user terminal comprising:
   a receiver that receives signal format information of the inter-terminal discovery signal from the other user terminal; and
   a processor that detects the inter-terminal discovery signal based on a signal format represented by the signal format information,
   wherein the receiver receives the inter-terminal discovery signal in transmission durations of a predetermined cycle,
   wherein the transmission duration includes a plurality of durations that vary for every number of resource units where the inter-terminal discovery signal is mapped, and
   wherein the receiver receives the inter-terminal discovery signal in durations for the number of resource units where the inter-terminal discovery signal is mapped.

8. An inter-terminal communication method for use in a radio communication system in which an inter-terminal discovery signal is transmitted from a first user terminal to a second user terminal without involving a radio base station, the inter-terminal communication method comprising the steps of:
   in the first user terminal:
      determining a signal format of the inter-terminal discovery signal based on a number of information bits of the inter-terminal discovery signal; and
      transmitting the inter-terminal discovery signal based on the signal format, and also transmitting signal format information that represents the signal format,
   wherein the inter-terminal discovery signal is transmitted in transmission durations of a predetermined cycle,
   wherein the transmission duration includes a plurality of durations that vary for every number of resource units where the inter-terminal discovery signal is mapped, and
   wherein the inter-terminal discovery signal is transmitted in durations for the number of resource units where the inter-terminal discovery signal is mapped; and in the second user terminal:
- receiving the signal format information from the first user terminal; and
- detecting the inter-terminal discovery signal based on the signal format represented by the signal format information.

\* \* \* \* \*